(12) United States Patent
Manders et al.

(10) Patent No.: US 8,474,905 B2
(45) Date of Patent: Jul. 2, 2013

(54) ROOF ASSEMBLY FOR A VEHICLE

(75) Inventors: Peter Christiaan Leonardus Johannes Manders, Horst (NL); Marcel Johan Christiaan Nellen, Merselo (NL); Eduardus Christianus Henricus Van Boxtel, Zeeland (NL); Frank Henricus Gerardus Van Der Logt, Bergen (NL); Robert Rikkert, Nuenen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/222,149

(22) Filed: Aug. 31, 2011

(65) Prior Publication Data

US 2012/0049584 A1 Mar. 1, 2012

(30) Foreign Application Priority Data

Sep. 1, 2010 (EP) .................................... 10174935

(51) Int. Cl.
*B60J 7/057* (2006.01)
(52) U.S. Cl.
USPC ..................................... 296/223; 296/216.08
(58) Field of Classification Search
USPC ................................................ 296/213–224
See application file for complete search history.

(56) References Cited

U.S. PATENT DOCUMENTS

| | | | |
|---|---|---|---|
| 6,196,625 B1 * | 3/2001 | Nagashima et al. | 296/213 |
| 6,582,014 B1 * | 6/2003 | Racine et al. | 296/223 |
| 6,830,291 B2 * | 12/2004 | Langguth | 296/216.08 |
| 6,974,183 B2 * | 12/2005 | Bergmiller et al. | 296/220.01 |
| 7,354,103 B2 * | 4/2008 | Esteban et al. | 296/216.08 |
| 7,914,072 B2 * | 3/2011 | Queener et al. | 296/210 |
| 8,075,050 B2 * | 12/2011 | Hotta et al. | 296/223 |

FOREIGN PATENT DOCUMENTS

| | | |
|---|---|---|
| DE | 10325327 | 3/2005 |
| DE | 102006051488 | 5/2008 |
| JP | 2001301466 | 10/2001 |

OTHER PUBLICATIONS

Official Search Report of the European Patent Office in counterpart foreign application No. EP10174935 filed Sep. 1, 2010.

* cited by examiner

*Primary Examiner* — Dennis Pedder
(74) *Attorney, Agent, or Firm* — Steven M. Koehler; Westman, Champlin & Kelly, P.A.

(57) ABSTRACT

A roof assembly for a vehicle having a roof opening in its fixed roof comprising a movable closure element for closing and opening the roof opening. A stationary part comprises guide rails extending transversely of the roof opening in vehicle longitudinal direction. A closure moving mechanism comprises an electric motor fixed to the stationary part, flexible drive cables guided in a guide through a defined path at least partly within said guide rails and being engaged by the electric motor in order to be moved through the guide and along the guide rails. The guide is constructed such that, when an excessive force is exerted on the cable by the closure element in the event of a crash, it allows the respective guide cable to deviate from the defined path dictated by the guide during normal use, to allow limited longitudinal movement of the closure element.

14 Claims, 10 Drawing Sheets

ROOF ASSEMBLY FOR A VEHICLE

BACKGROUND

The discussion below is merely provided for general background information and is not intended to be used as an aid in determining the scope of the claimed subject matter.

A roof assembly having a closure element can be driven by a pull cable drive. Regardless of opening or closing the closure element, a steel cable is loaded by an electric motor with a pulling force only. Furthermore the driving motor is placed in the rear of the vehicle. In case the vehicle is subjected to a head on collision, occurring in such situation where the closure element of the open roof system is in its open position, the pull cable is loaded with an impact force, initiated by the kinetic energy of the closure element in its open position. This impact force may damage the pull cable, and ultimately break the cable, after which the connection between car and closure element is partly lost. A spring biased construction can be connected to the pull cable to allow, in case of a collision, the impact force to be absorbed without any damage to the pull cable.

In another structure of a roof assembly, the assembly has a closure element, slidably guided in a guide and connected with a drive unit, and equipped with a brake system, that decelerates the closure element, in a situation in which the closure element is in its open position, and the vehicle is subjected to a frontal crash.

The brake system is designed such that it breaks upon impact and thereby interrupts the connection between closure element and drive unit. Due to this breakage, the brake system is able to convert into a wedge type brake system, whereby two wedge parts slide relative to each other until this movement is stopped, due to the two parts being stuck inside the channel of the guide rail.

The solutions described above are for the purpose of the specific circumstances of a vehicle having a roof assembly, comprising a closure element and a driven element, and whereby the closure element is in its open position when a collision happens. The solutions described above are additional systems, adding weight and cost to the roof assembly and, may be in an area of the open roof system, namely the closure moving mechanism, where the packaging space is very limited. Apart from weight, cost and space the fact that the connection between closure element and drive unit is broken, leads to the risk of the closure element being separated from the car in case the remaining brake system is forced out of its guiding rail by the large deceleration forces.

The spring biased pull cable system has the disadvantage of being biased also during normal operation of opening and closing the closure element. This may cause misalignment of the closure element in situations where the closure element is facing obstructions in its operating mechanism whereby, due to the obstructions, the spring is compressed slightly, so that the closure element's position relative to the drive unit is shifted. In such situations the electronic positioning for the closure element in the drive unit does not match with the actual positioning of the closure element. This may cause serious malfunctioning problems of the roof assembly.

It is a requirement of several vehicle manufacturers that for a roof assembly with a closure element in its open position, in case of a collision, the closure element is moved a short distance in longitudinal direction only. This requirement is set to absorb the kinetic energy of the closure element in case of a collision, while keeping a full connection between closure element, drive unit and guiding rails, on the one hand, and to avoid a situation in which an object can be caught between the closure element and the aperture opening of the fixed roof, on the other hand. This is necessary due to the fact that the anti pinch detection and reversal motion of the closure element does not function in case of longitudinal movement of the closure element during a collision. The longitudinal distance required for the closure element to move during a collision is different for the various vehicle manufacturers.

Furthermore it is a requirement of vehicle manufacturers that the roof assembly, when the closure element is in its open position, its normal functions is preserved after the vehicle is subjected to what is called a city crash. This definition of city crash is used to designate light crashes, with low vehicle speeds, whereby the deceleration is below an average value of about $15 \text{ m/s}^2$. Above this deceleration value the requirement may not be valid.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. An aspect of the invention is to have a solution for absorbing kinetic energy of a closure element of a roof assembly in its open position during a vehicle collision, in such a way that a certain predefined longitudinal movement of the closure element is reached, while maintaining the mechanical connection between closure element, drive unit and guide rails.

It should be noted that the chance of having a front or rear collision, with a vehicle having a roof assembly with its closure element in a open position, is relatively small compared to the time of actual use and functioning of the roof assembly in the vehicle's lifetime. It is therefore important that when a vehicle manufacturer requires a solution for absorbing kinetic energy of the closure element, the solution does not make the mechanism parts necessary to operate the closure element in a normal way, more expensive, heavier and/or complex than is necessary for its normal operation.

Also any parts used are positioned in such area of the open roof system where there is space to place it. This means that the parts are not placed in the packaging space of the mechanism parts which are directly operating the closure element, since the space these parts occupy is the subject of continuous effort to reduce it.

In most roof assemblies the closure element which opens or closes a roof opening in a fixed roof of a vehicle, is driven by an electric motor, connected to a stationary part, being firmly fixed to the body of the vehicle. The electric motor drives a drive cable slidably in a guide, the drive cable in its turn drives a cluster of mechanism parts, which are mechanically connected, and which are mainly sliding in the guide rail, and ultimately operate the closure element.

The guide in which the drive cable slides may be steel or aluminum tubes, or may be substantially plastic channels, also the guide may at least partly be part of the guiding rails.

In the event of a collision the kinetic energy exerted by the closure element in a longitudinal vehicle direction is led through the mechanism parts and is further substantially led via the drive cable to the electric motor. The electric motor is a rigid stop, due to its inner gear ratio and its electric brake feature. The driving gear of the motor, engaging the drive cable will normally not rotate upon an impact force applied on the drive cable.

To meet the requirement of a predefined longitudinal movement of the closure panel upon a collision, and the requirement that a mechanical connection is always maintained between the closure element and the vehicle, the drive cable is used to absorb the kinetic energy applied by the closure element in an event of a collision. In other words the drive cable absorbs the kinetic energy over a distance substantially equal to the length of the longitudinal movement of the closure element during a vehicle collision. In such event the drive cable guided in the guide may exit the guide through one or more relatively small exit openings. In the direct vicinity of the exit opening a part having a limited inner space is connected to the guide. The exiting drive cable is pushed out of the exit opening and is caught in the limited space adjacent the exit opening. In this way the drive cable is diverted from the defined path of the guide, but is gradually prevented from further leaving the guide.

The kinetic energy is partly absorbed by the drive cable exiting through the at least one exit opening, whereby the exit opening may be deformed permanently, partly by the limited space stopping the drive cable from further exiting the guide, whereby it is possible that the walls of the limited space are deformed permanently too, and partly by the resistance to bend and/or deform the drive cable itself.

The location of the exit opening(s) and the limited space may be in an area of the roof assembly where packaging space is available.

In this way a solution is proposed, whereby for different requirements of longitudinal movement of a closure element in the event of a collision, i.e. different longitudinal movements, a safe, cheap, and light-weight product may be manufactured, but also a method is disclosed to meet the aforementioned requirements.

The limited space may be a partly confined space, whereby one or more walls may be omitted, which do not contribute to limiting the movement of the drive cable. The space will thus generally be confined in a direction in which the drive cable moves through the exit opening(s).

The limited space may be defined by walls of steel, aluminum, plastic or the like.

The limited space may be defined by one or more deformable walls, whereby the one or more walls may be shaped like a bellows or folded tube buffer.

The limited space may be a partly confined space, limited by non roof assembly parts, or a combination of roof assembly parts and non roof assembly parts.

The guide may have at least one bend in its path, and wherein the at least one exit opening is positioned in at least one of the inner and outer sides of the bend.

The direction of the collision or crash (relative to the position of the electric motor, drive cable and closure element) may be such that instead of a push force, a pull force is exerted on the drive cable. In such case the at least one exit opening is positioned in the guide in such a way that it is possible for the drive cable to take a straighter path between its connection with the mechanism parts and the electric motor. This allows a limited movement of the pulling end of the drive cable and thus of the closure element.

BRIEF DESCRIPTION OF THE DRAWINGS

Hereinafter aspects of the invention will be further explained with reference to the drawings showing an embodiment of the roof assembly by way of example.

DETAILED DESCRIPTION OF THE ILLUSTRATIVE EMBODIMENTS

Figure 1:
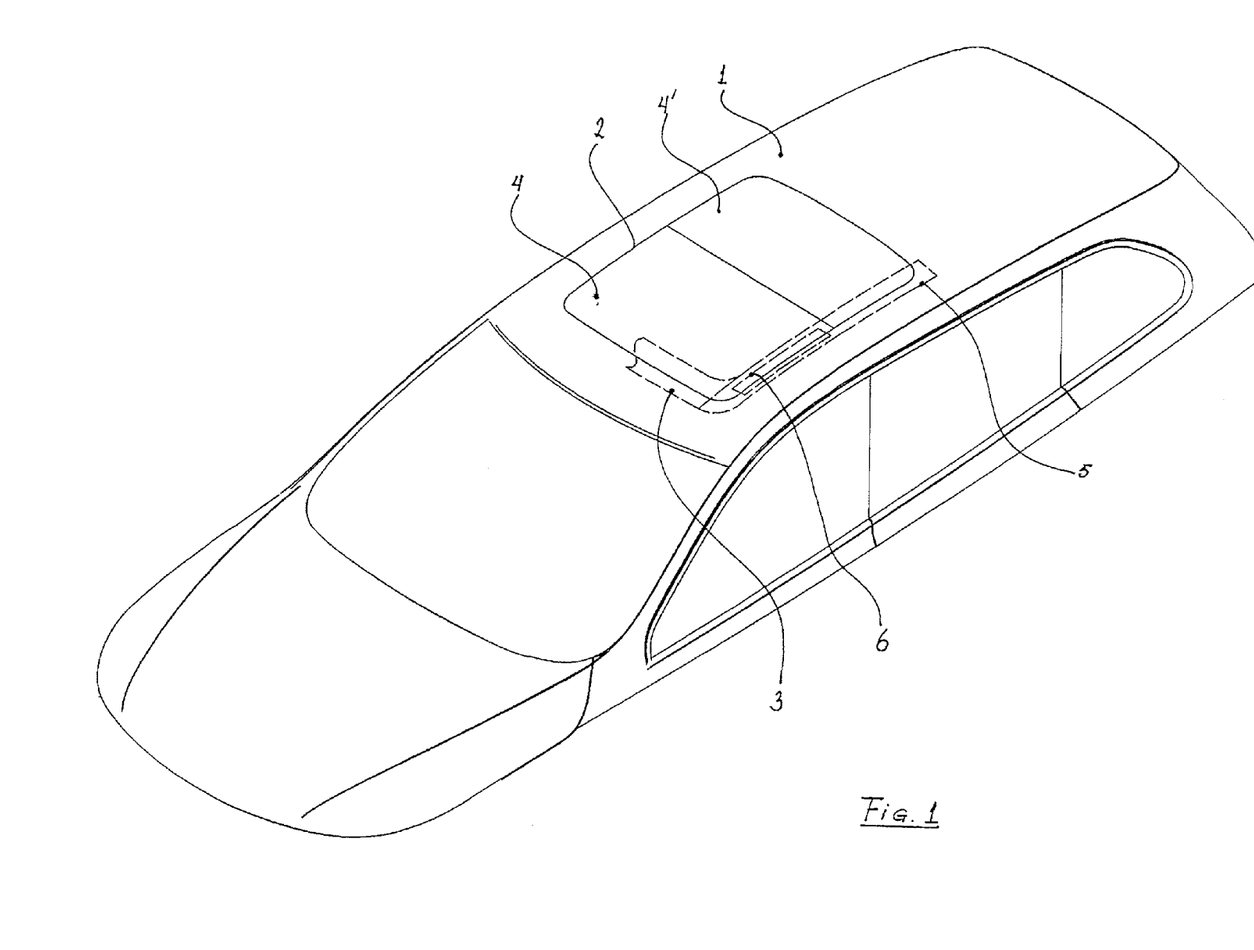
FIG. 1 is an isometric plan view of a vehicle which is provided in its fixed roof with a roof assembly.

Referring to FIG. 1, a roof assembly for a vehicle, in particular a passenger car, is shown. Either the vehicle or the roof assembly comprises a fixed roof 1 having a roof opening 2 therein. A closure element 4 of the roof assembly is capable of selectively opening and closing the roof opening 2. A stationary part 3, here a frame, is attached to the fixed roof 1 and supports, in a manner yet to be described in more detail, the closure element 4. The illustrated embodiment is a so called sliding tilting roof with two closure elements 4 and 4', only one of which (the front element 4) is capable of opening and closing the roof opening 2. Said movable closure element 4 is a rigid panel, which can be moved from the closed position in the roof opening 2 to a venting position, in which it slopes upwardly from the front to the rear end (tilting, not shown), and which can be moved further rearward to a position above the fixed roof 1. (sliding, not shown).

Figure 2:
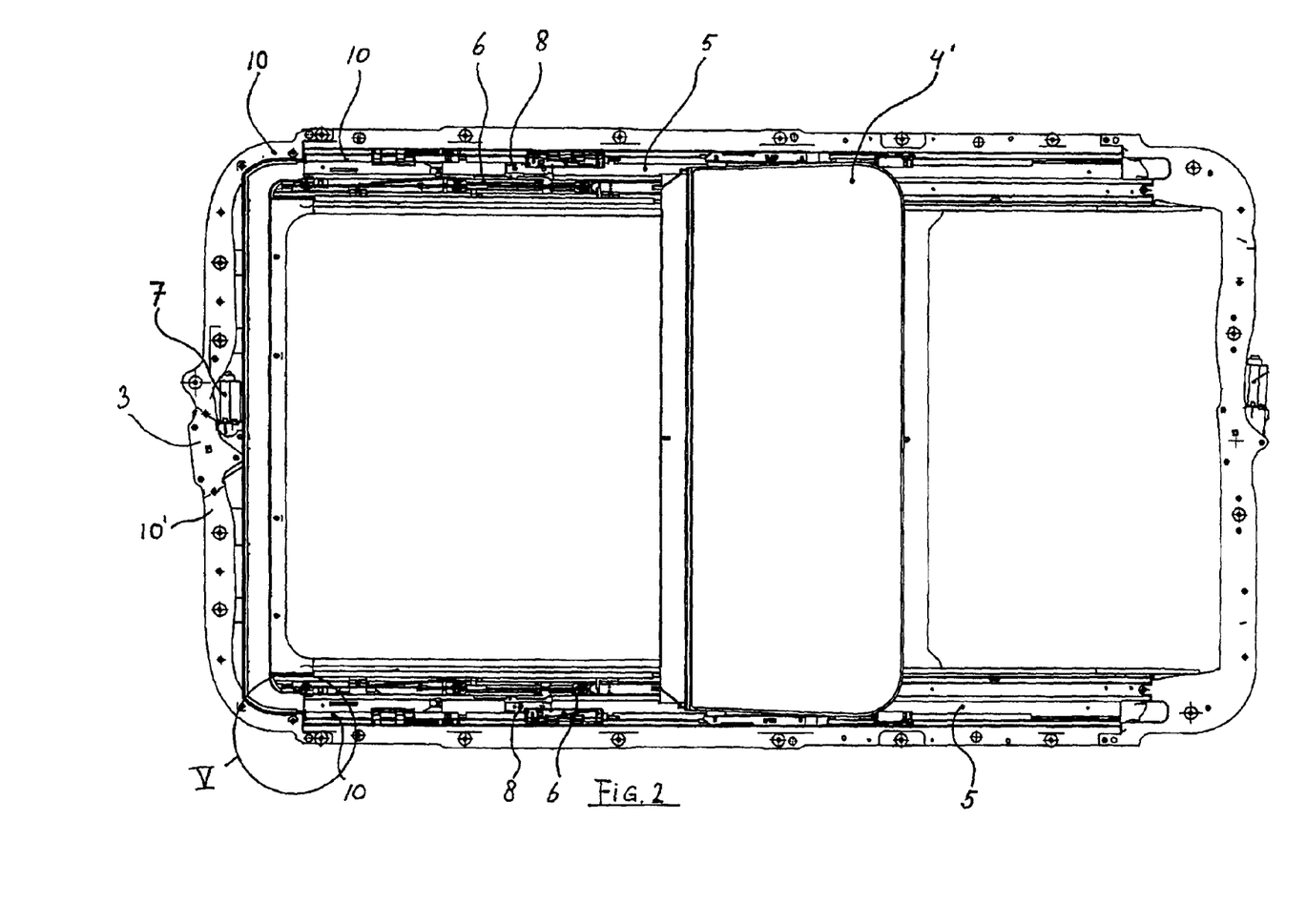
FIG. 2 is a plan view of the roof assembly in which the front closure element is omitted, to clearly show parts that would otherwise be invisible.

In FIG. 2, the roof assembly is shown without its movable closure element 4 to clearly show a number of parts mounted below it. On the left side of the drawing (which is the front side of the vehicle) the electric motor 7 is fixedly connected to the stationary part 3, in particular to a transverse beam of the frame. A drive wheel (not shown) of the motor 7 is engaged with two drive cables 8, said drive cables 8 being guided in a guide 10. The guide 10, in the embodiment shown, is formed by channels in the stationary part 3 (here in the front transverse beam), and a cover plate 10' covering the channels, and thereby creating a closed section through which the drive cable 8 can be moved lengthwise, but in transverse direction of the vehicle. On each lateral side of the roof assembly a mirror imaged guide rail 5 is provided, said guide rails 5 being also equipped with the guide 10 for guiding the drive cables 8 in longitudinal direction of the vehicle. The guide rails 5 are furthermore each equipped with one or more channels for slidably receiving a movable closure mechanism 6. Each drive cable 8 is connected at one of its ends to the respective movable closure mechanism 6, said mechanism comprising several movable closure support parts 6' that form a mechanical chain between the drive cable 8 and the guide rails 5 on one (lower) side and the closure element 4 on the opposite (upper) side.

Figure 3:
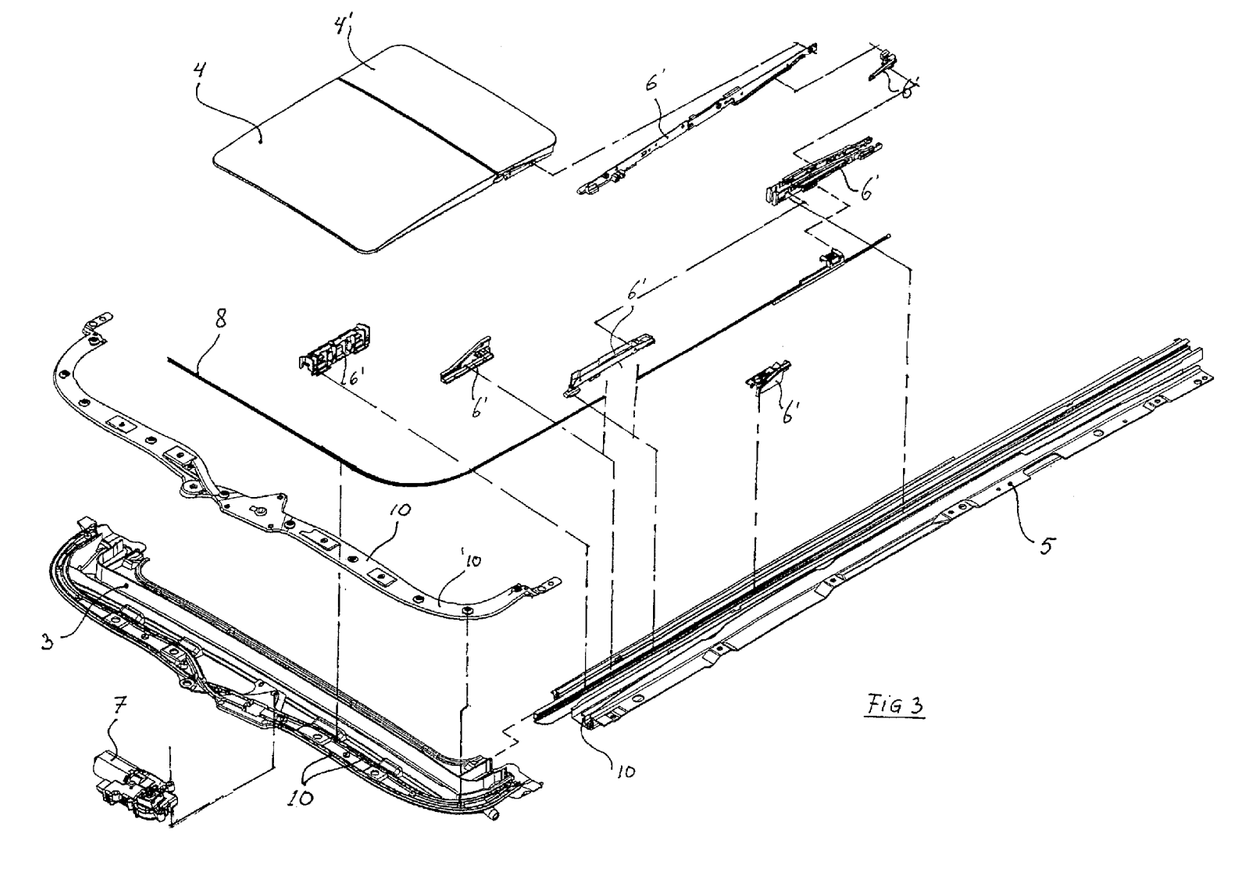
FIG. 3 is an exploded view of a part of the roof assembly, whereby for clarity, only one mirror imaged side of the guide rails and the mechanism parts is shown, while the closure elements are shown on a smaller scale.

In FIG. 3 the roof assembly is shown partly, but in exploded view, in which it is shown in more detail the electric motor 7 to be connected to the stationary part 3, the channels forming the guide 10 in said stationary part, and the cover plate 10', covering said channels in said stationary part 3. Further it is clarified how the guide rails 5, of which here only one is shown, are connected to the front transverse beam of the stationary part 3. Also is shown in detail the number of movable closure support parts 6' and how they could be slidably connected to the guide rail 5, connected to the drive cable 8, and to the closure element 4, and how they can interact, so as to form a mechanical chain between the drive cable 8 and guide rails 5 on one end and the closure element 4 on the other end.

Figure 4:
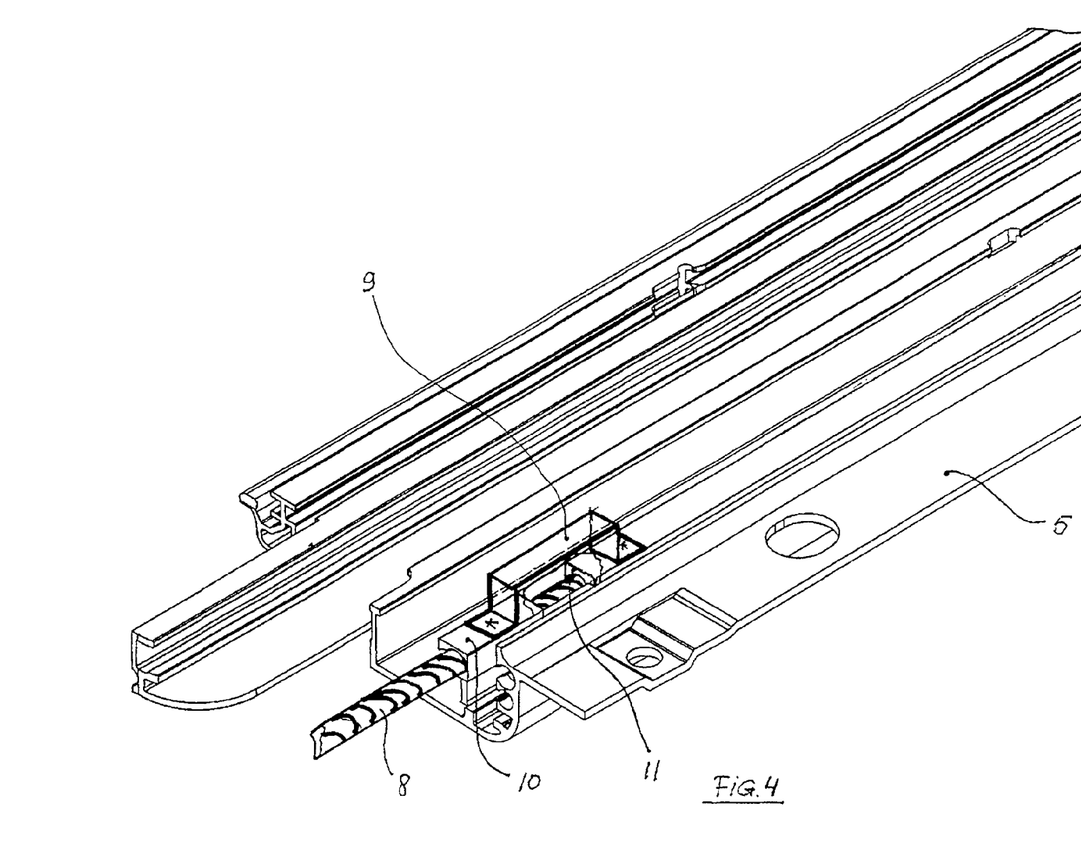
FIG. 4 is an isometric view and a partly transparent view of a first embodiment, showing the front part of the guide rails, a part of the guide, the drive cable and the limited space.

In FIG. 4 there is shown a first embodiment of the limited space 9, which is a confined space in this embodiment and is connecting to the guide 10. Due to the partly transparent view of the limited space 9, an exit opening 11 in the guide 10 of the guide rail 5 is visible and so is a part of the drive cable 8. The exit opening 11 may be created by milling or drilling a hole in the guide 10 of the guide rail 5, which is at least as long as twice the diameter of the drive cable 8, and preferably longer. The limited space 9 is positioned over the exit opening 11 and defined by a box placed and fixed with an open side on the guide 10. In one embodiment, the exit opening 11 and the accompanying limited space 9 are placed in the vicinity of the front or the rear end of the guide rail 5. In the case of a crash, a pushing force is exerted by the closure element 4 on the drive cable 8 and this cable is pushed sideways at the position of the exit opening 11, thus exiting the guide 10 in a direction perpendicularly thereto, here in upward direction. It then enters the confined space 9 where a limited length of the deforming drive cable 8 deformed into a loop can be received, thus allowing a limited movement of the closure element 4 to absorb the kinetic energy thereof.

Figure 5:
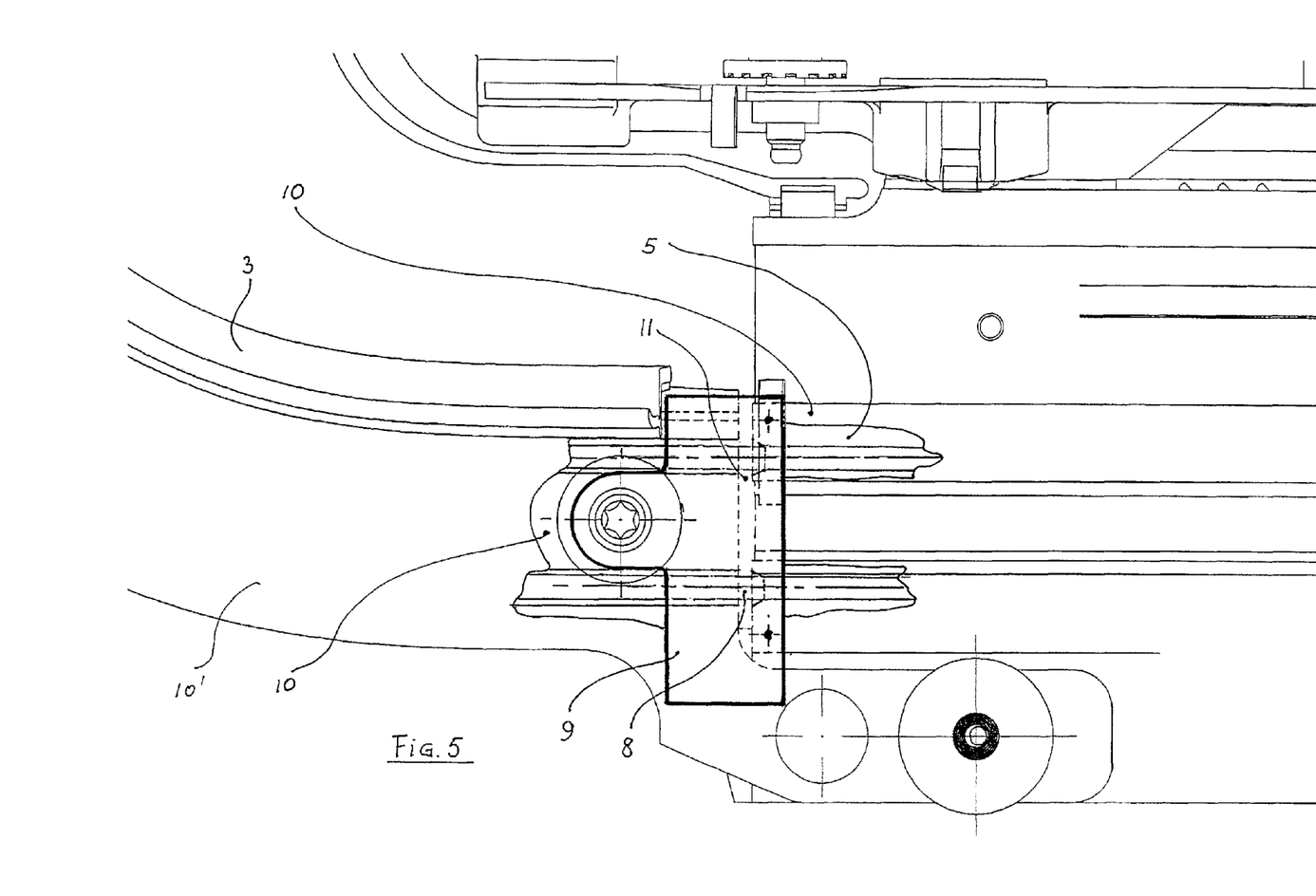
FIG. 5 is a plan view of a second embodiment, showing a limited space between a guide rail having a guide on the right side, and a stationary part having a guide on the left side, and shown the drive cable guided in the guide in dotted lines.

In FIG. 5 there is shown a second embodiment of the limited space 9, wherein said space 9 is a partly confined space. The stationary frame part 3 is connected to the guide rails 5, and a guide 10 in the stationary part 3 and in the guide rails 5 are substantially aligned so that drive cables 8 can slide from said stationary part 3 into said guide rails 5. The part defining the partly confined space 9 is connected to the stationary part 3 on its one end, and to each guide rail 5 on its other end. The exit opening 11 is created by a gap between the stationary part 3 and each guide rail 5 in the area of the confined space 9. The gap in upward direction (not shown) will be larger than in downward direction so that the drive cable can only escape the guide rail 5 in upward direction. The part defining the partly confined space 9 will be positioned where the drive cable 8 will leave the exit opening 11 so that the cable will meet this part and will eventually be stopped from further exiting the guide, thereby only allowing a limited displacement of the closure element 4.

Figure 6:
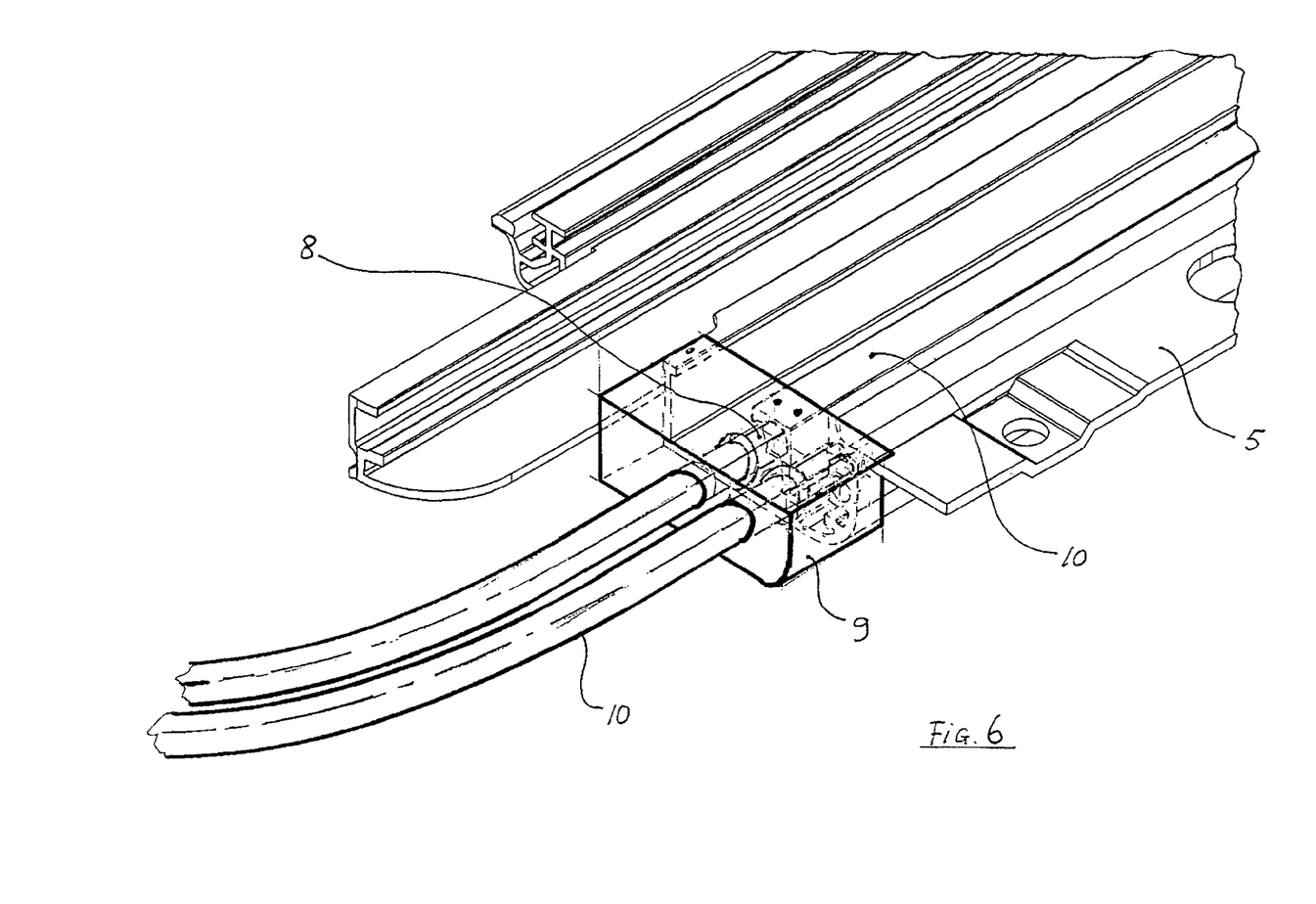
FIG. 6 is an isometric view of a third embodiment, showing a limited space connected to the guide on the left side, comprising tubes in which the drive cable is guided, and connected on the right side to the guide rails, comprising the guide.
Figure 7:
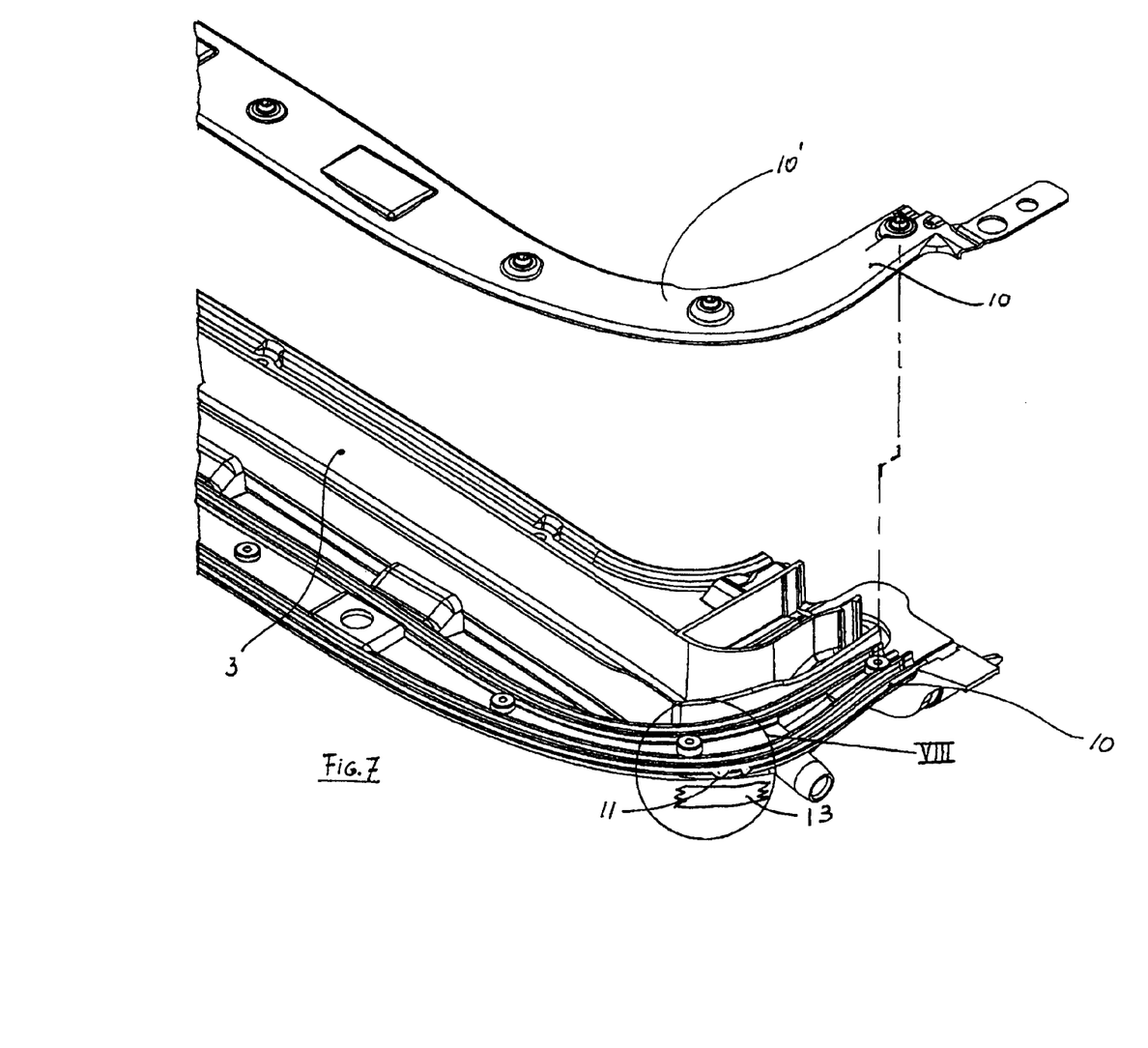
FIG. 7 is an isometric view of a fourth embodiment of a limited space involving a guide in a stationary part. The drive cable is not shown here.
Figure 8:
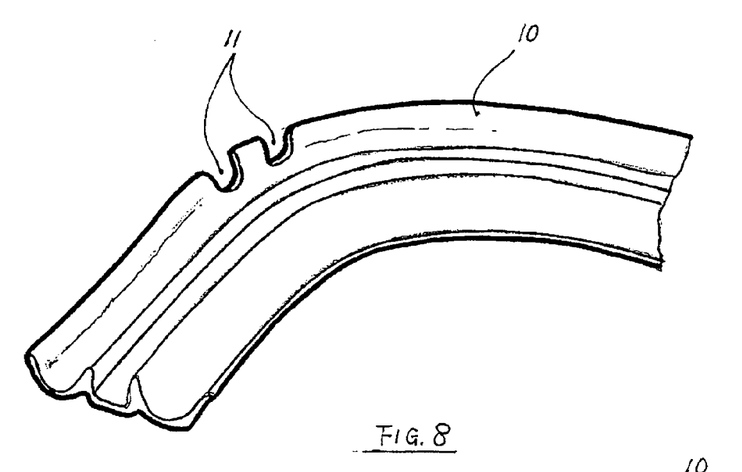
FIG. 8 is an isometric view and detailed view of the same fourth embodiment of FIG. 7, but seen from an opposite angle.

In FIG. 6 there is shown a third embodiment of the limited space, wherein the limited space 9 is a partly confined space. The limited space 9 is connected to the guide 10 on one end, wherein the guide 10 are drive tubes through which the drive cable 8 is guided, and to the guide rails 5 on its other end. The exit opening 11 is here formed by the gap between the end of the guide 10, being the drive tubes, and an edge part of the guide rail 5. Furthermore an exit part of the drive tubes is aligned with an entrance part of the guide 10 in the guide rail 5, so that the drive cable 8 can easily slide from the drive tubes into the guide rails 5 during normal use, and can leave the guide during a crash when the drive cable 8 is loaded with a pushing force. In FIGS. 7 and 8 there is shown a fourth embodiment of the limited space. Stationary part 3 is shown to have a guide 10, which are here integrated channels, for guiding drive cables 8 (which are not shown here). Also shown is the top part of the guide 10, which is the cover 10'. Said cover 10', when connected to the stationary part 3 forms channels with a closed cross section. The guide 10 in said stationary parts has exit openings 11, created at least by interruptions in the outer wall of the channel, which are clearly shown in FIG. 8. The position of these interruptions is preferably in a outer side of a bend of the guide 10. The wall part of the channel between the interruptions is deformable so that a larger exit opening is created when the drive cable 8 pushes against the wall part between the exit openings 11 allowing the drive cable to leave the guide 10. The limited space 9 is here a partly confined space, whereby the walls of said limited space are formed at least partly by non roof assembly parts (represented schematically by part 13).

Figure 9:
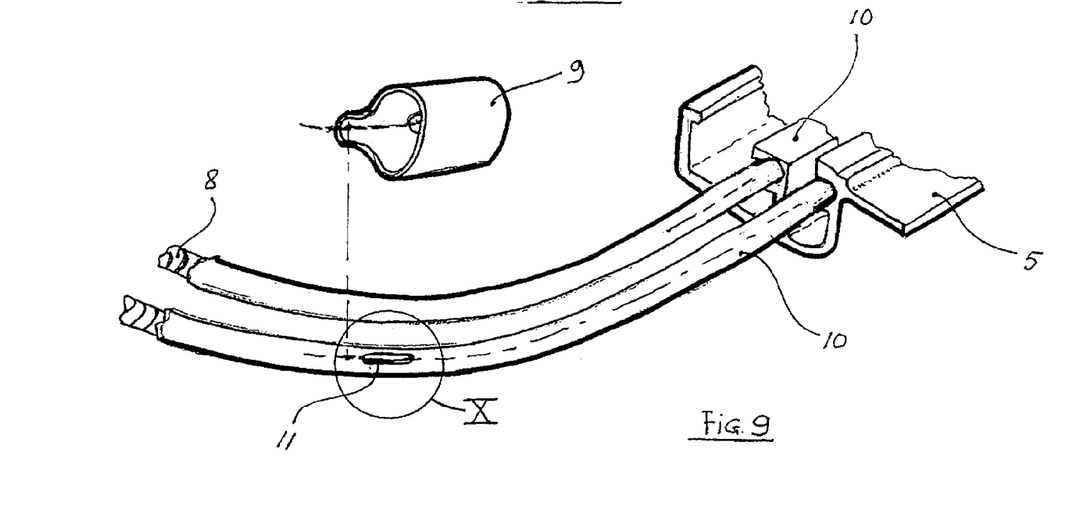
FIG. 9 is an exploded view of a fifth embodiment of a limited space, involving a guide comprising drive tubes.
Figure 10:
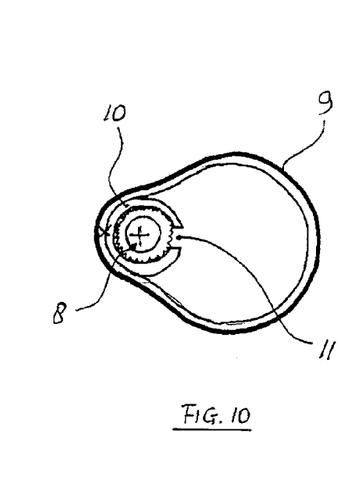
FIG. 10 is a cross sectional view of a fifth embodiment, showing the limited space connecting to the guide in the vicinity of the exit opening.

In FIGS. 9 and 10 there is shown a fifth embodiment of the limited space 9. The guide 10, here drive tubes, are connected to a guide entrance of the guide rail 5. The exit opening 11, here a slotted hole, is positioned in the outer side wall of a bend in the drive tube. The drive cable 8 slides through the guide 10, being the drive tubes, into the guide of the guide rail. In this embodiment the limited space 9 is a partly confined space formed by a part connected to the guide 10 and having a substantially bulb-shaped cross section bulging on the outer side wall of the bend containing the slotted hole forming the exit opening 11.

Figure 11A:
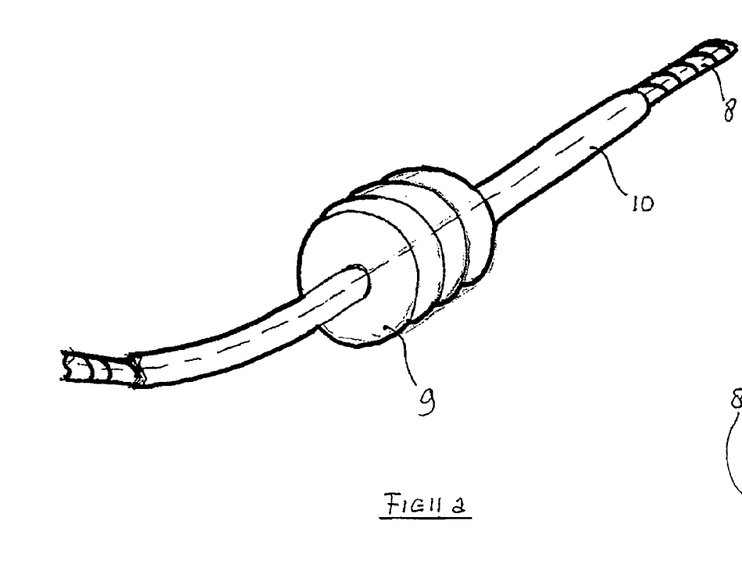
FIG. 11a is a isometric view of a sixth embodiment showing the limited space as a bellows.
Figure 11B:
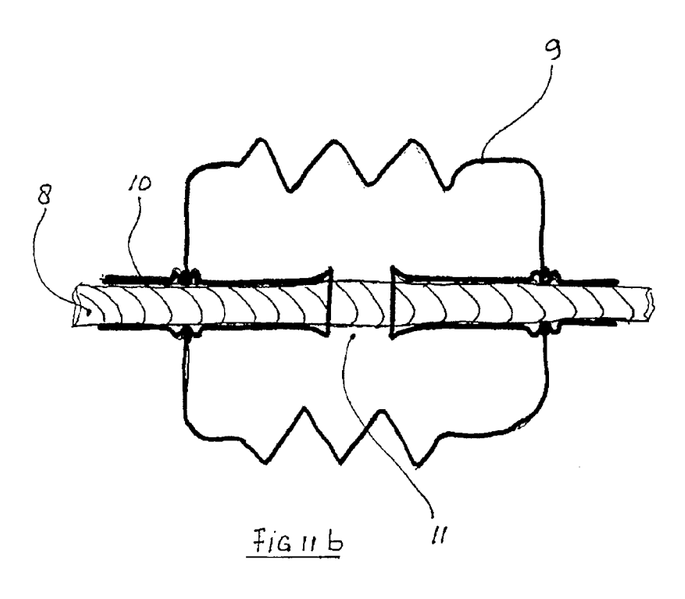
FIG. 11b is a cross sectional view of the sixth embodiment showing the limited space connecting to the guide, and the exit openings.

In FIGS. 11*a* and 11*b* there is shown a sixth embodiment of the limited space 9. Here the limited space is a confined space, whereby the walls have a shape like an bellows or folded tube buffer. The part forming the limited space 9 is connected to the guide 10, whereby in this embodiment the guide 10 is a drive tube guiding the drive cable 8. The drive tube is formed by at least two aligned parts. The exit opening 11 is a gap between the two parts of the drive tube. During a crash, one of the drive tube parts will be compressed or be moved such that the bellows can extend and the exit opening will become large enough to enable the cable to enter the confined space 9

Figure 12:
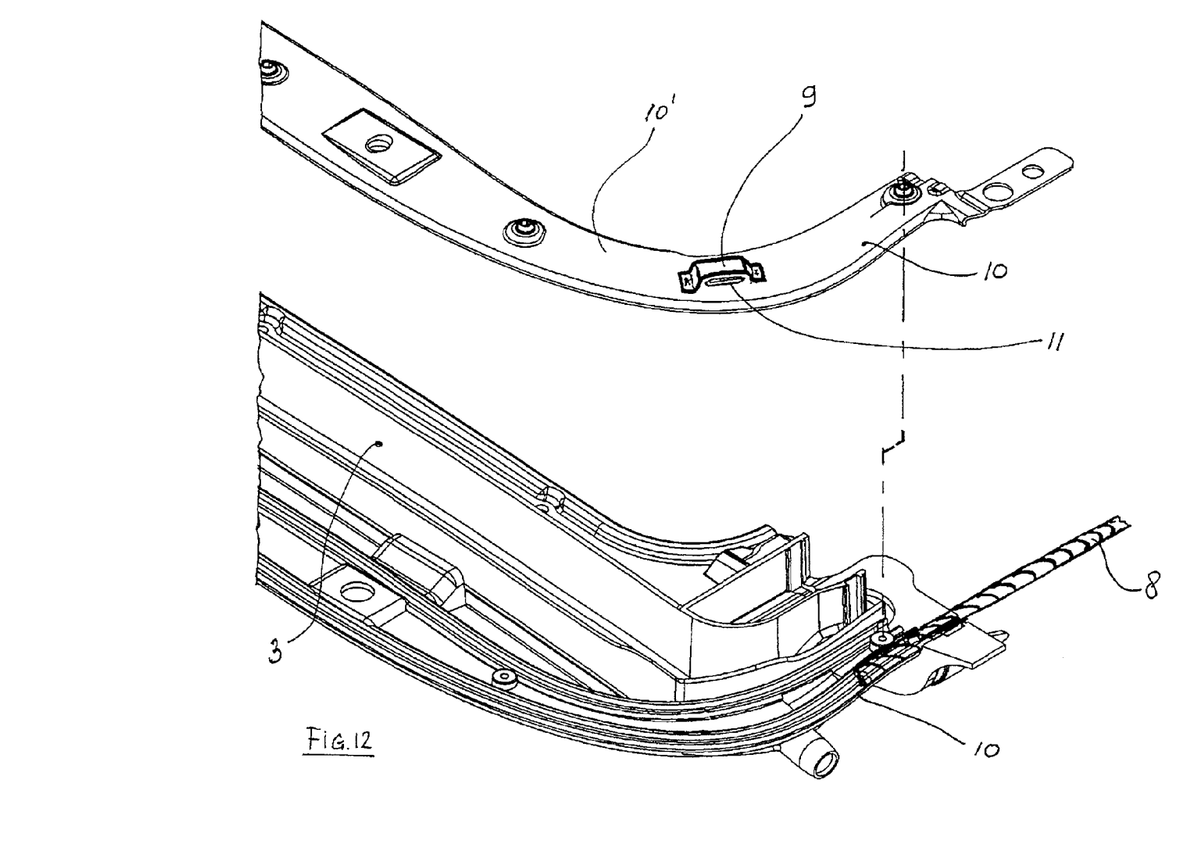
FIG. 12 is an exploded view of a seventh embodiment of the limited space, involving a stationary part.

In FIG. 12 there is shown a seventh embodiment of the limited space 9. Here the limited space 9 is a partly confined space. The stationary part 3 having integrated channels that form part of the guide 10, receives a cover 10' to cover the channels and form a closed cross section of the channels, for the drive cables 8 to slide through. The exit opening 11 is formed in the cover 10' and is shaped as a slotted hole extending substantially parallel to the guide below the cover 10'. The limited space is formed by a bracket fixed to the cover 10' and overlying the exit opening 11 so as to stop the drive cable 8 exiting the exit opening 11 when a large pushing force is exerted on the drive cable by the closure element in the event of a crash.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

Thus, the invention can also be used with other types of roof assemblies, such as roofs wherein the closure element, when opening the roof opening, is lowered vertically and moved backwardly under the fixed roof, roofs in which the closure element can only be tilted and roof assemblies that comprise more than one movable and/or stationary closure element. It is also conceivable that the electric motor is placed elsewhere in the roof assembly, for example at the rear of the stationary part. In that case, the cable will be loaded with a large pulling force if the vehicle is crashed on the front side. To absorb such kinetic energy, the guide can allow the cable to divert from a defined bending path into a more straight path, for example the guide can have a slit on the inner side of a bend, which opens when the drive cable is stretched by the closure element allowing the drive cable to leave a part of the guide so as to enable the closure element to make a limited movement. It is also conceivable that the guide normally takes up a tortuous such as a sinusoidal shape in a defined part, which is able to deform into a more straight shape when the cable is stretched by the closure element thereby also allowing a limited movement of the cable end and the closure element attached to it. Reversely, the drive cable and guide may deform on a defined position and in a controlled manner from a more straight shape to a more tortuous shape when a compressive force is exerted by the closure element on the drive cable in case of a crash.

The invention claimed is:

1. A roof assembly for a vehicle having a roof opening in its fixed roof, comprising:
   a movable closure element for closing and at least partly opening said roof opening,
   a stationary part comprising guide rails extending transversely of the roof opening in a vehicle longitudinal direction,
   a closure mechanism comprising an electric motor fixed to the stationary part,
   a flexible drive cable guided in a guide through a defined path at least partly within at least one of said guide rails and being engaged by the electric motor in order to be moved through the guide and along said at least one of the guide rails, and
   a movable support movably guided in the and connected to the closure element and to the drive cable to adjust the closure element,
   wherein the guide has an exit opening that is generally perpendicular to the defined path and opens into an at least partly confined space defined in part by a surface of the roof assembly that faces and is spaced apart from the exit opening, the confined space being defined by deformable walls, and
   wherein the exit opening and proximity of the surface to the exit opening are configured to allow a portion of the flexible drive cable to deviate from the defined path and enter the confined space via the exit opening and engage the surface, thereby allowing a limited movement of the closure element to absorb kinetic energy of the closure element when the drive cable is loaded by the closure element with a pushing force.

2. The roof assembly of claim 1, wherein the at least partly confined space is limited by walls made of at least one of steel, aluminum, and plastic.

3. The roof assembly of claim 1, wherein the deformable walls are shaped like a folded tube buffer.

4. A roof assembly for a vehicle having a roof opening in its fixed roof, comprising:
   a movable closure element for closing and at least partly opening said roof opening,
   a stationary part comprising guide rails extending transversely of the roof opening in a vehicle longitudinal direction,
   a closure moving mechanism comprising an electric motor fixed to the stationary part,
   a flexible drive cable guided in a guide through a defined path at least partly within at least one of said guide rails and being engaged by the electric motor in order to be moved through the guide and along said at least one of the guide rails, wherein the guide is configured to guide the drive cable through at least one bend in its defined path, the bend having a radially outward facing side and an inward facing side, and
   a movable closure support movably guided in the guide rail and connected to the closure element and to the drive cable to adjust the closure element,
   wherein the guide has an exit opening that is generally perpendicular to the defined path and opens into an at least partly confined space defined in part by a surface of the roof assembly that faces and is spaced apart from the exit opening, wherein the exit opening has the shape of an elongated slot formed in the guide on at least one of the outward facing side and inward facing side of the bend,
   wherein the exit opening and proximity of the surface to the exit opening are configured to allow a portion of the flexible drive cable to deviate from the defined path and enter the confined space via the exit opening and engage the surface, thereby allowing a limited movement of the closure element to absorb kinetic energy of the closure element when the drive cable is loaded by the closure element with a pushing force.

5. A roof assembly for a vehicle having a roof opening in its fixed roof, comprising:
   a movable closure element for closing and at least partly opening said roof opening,
   a stationary part comprising guide rails extending transversely of the roof opening in a vehicle longitudinal direction,
   a closure moving mechanism comprising an electric motor fixed to the stationary part,
   a flexible drive cable guided in a guide through a defined path at least partly within at least one of said guide rails and being engaged by the electric motor in order to be moved through the guide and along said at least one of the guide rails, wherein the guide has an exit opening generally perpendicular to the defined path,
   a movable closure support movably guided in the guide rail and connected to the closure element and to the drive cable to adjust the closure element, and
   a surface that faces and is spaced apart from the exit opening,
   wherein a direction of a crash is such that the closure element exerts a pushing force on the drive cable and the drive cable is forced out of the exit opening of the guide into a limited space, wherein the exit opening and proximity of the surface to the exit opening are configured to allow a portion of the flexible drive cable to deviate from the defined path and extend through the exit opening and engage the surface to allow a limited movement of the closure element to absorb kinetic energy of the closure element, wherein the limited space holds the drive cable, exiting the guide through the exit opening, in its volume, thereby stopping the drive cable from further exiting the guide.

6. The roof assembly of claim 5, wherein the limited space is permanently deformed by the drive cable to a predefined limit.

7. The roof assembly of claim 5, wherein the exit opening is deformed by the drive cable to a predefined limit.

8. The roof assembly of claim 1, wherein an extent of movement of the closure element is determined by at least one of the size of the exit opening in the guide, the volume and shape of a limited space relative to the exit opening, a resistance of said limited space to deform, and a bending flexibility of the drive cable.

9. A roof assembly for a vehicle having a roof opening in its fixed roof, the roof assembly comprising:
 a closure element;
 a drive mechanism;
 a flexible drive cable operably coupled to the drive mechanism and the closure element;
 a structure configured to guide the flexible drive cable in a guide path to move the closure element with respect to the roof opening in a longitudinal direction of the vehicle with operation of the drive mechanism, wherein the structure comprises:
  a drive tube in which the flexible drive cable is disposed, the drive tube including a bend having a radially outward facing side and an inward facing side;
  an exit opening that is generally transverse to the guide path and configured to allow longitudinal movement of the closure element by allowing the flexible drive cable to deviate from the guide path when a threshold force is exerted on the flexible drive cable by the closure element, wherein the exit opening comprises a slot formed on at least one of the outward facing side and inward facing side of the bend; and
  an element that is spaced apart from and faces the exit opening and is configured to engage the flexible drive cable when the flexible drive cable exits the exit opening with longitudinal movement of the closure element.

10. The roof assembly of claim 9, wherein the element forms a space that is at least partially confined and configured to hold a portion of the flexible drive cable exiting the exit opening thereby restricting further movement of the flexible drive cable within the guide path.

11. The roof assembly of claim 10, wherein the element comprises deformable walls.

12. The roof assembly of claim 9, wherein the element at least partially surrounds the bend in the drive tube.

13. A vehicle comprising:
 a fixed roof having a roof opening; and
 a roof assembly comprising:
  a movable closure element for closing and at least partly opening the roof opening;
  a stationary part comprising guide rails extending transversely of the roof opening in a longitudinal direction of the vehicle;
  a closure moving mechanism comprising an electric motor fixed to the stationary part;
  a flexible drive cable guided in a guide through a defined path at least partly within at least one of said guide rails and being engaged by the electric motor in order to be moved through the guide and along said at least one of the guide rails, wherein the guide is configured to guide the drive cable through at least one bend in its defined path the bend having a radially outward facing side and an inward facing side; and
  a movable closure support movably guided in at least one guide rail and connected to the closure element and to the drive cable to adjust the closure element;
  wherein the guide has an exit opening generally perpendicular to the defined path and a portion of the fixed roof faces and is spaced apart from the exit opening, and wherein the exit opening and proximity of the fixed roof portion to the exit opening are configured to allow a portion of the flexible drive cable to deviate from the defined path and extend through the exit opening and engage the fixed roof portion to allow a limited movement of the closure element to absorb kinetic energy of the closure element, wherein the exit opening has the shape of an elongated slot formed in the guide on at least one of the outward facing side and inward facing side of the bend.

14. The vehicle of claim 13, wherein the exit opening opens into an at least partly confined space defined in part by the fixed roof portion into which the drive cable enters via the exit opening, thereby allowing a limited movement of the closure element in the event of a threshold pushing force loaded on the drive cable by the closure element.

* * * * *